(12) United States Patent
Jung et al.

(10) Patent No.: US 12,379,222 B2
(45) Date of Patent: Aug. 5, 2025

(54) POINT-TO-POINT AUTONOMOUS DRIVING PATH GENERATION AND DRIVING CONTROL METHOD BASED ON NAVIGATION ROUTE AND HIGH DEFINITION MAP

(71) Applicant: INAVI SYSTEMS CORP., Gyeonggi-do (KR)

(72) Inventors: Han Soo Jung, Gyeonggi-do (KR); Seung Ho Yoon, Gyeonggi-do (KR); Da El Choi, Gyeonggi-do (KR)

(73) Assignee: INAVI SYSTEMS CORP., Gyeonggi-do (KR)

( * ) Notice: Subject to any disclaimer, the term of this patent is extended or adjusted under 35 U.S.C. 154(b) by 311 days.

(21) Appl. No.: 18/085,189

(22) Filed: Dec. 20, 2022

(65) Prior Publication Data

US 2023/0204374 A1    Jun. 29, 2023

(30) Foreign Application Priority Data

Dec. 23, 2021 (KR) .................. 10-2021-0185907
Aug. 8, 2022 (KR) .................. 10-2022-0098515
Aug. 8, 2022 (KR) .................. 10-2022-0098516

(51) Int. Cl.
  *B60W 60/00*    (2020.01)
  *G01C 21/36*    (2006.01)

(52) U.S. Cl.
  CPC ..... *G01C 21/3658* (2013.01); *B60W 60/0011* (2020.02); *G01C 21/3667* (2013.01); *B60W 2552/53* (2020.02)

(58) Field of Classification Search
  CPC .......... G01C 21/3658; G01C 21/3667; B60W 60/0011; B60W 2552/53
  See application file for complete search history.

(56) References Cited

U.S. PATENT DOCUMENTS

2022/0026224 A1* 1/2022 Zhao .................... G05D 1/0219
2022/0388534 A1* 12/2022 Schneemann ........ G05D 1/0088

FOREIGN PATENT DOCUMENTS

KR    1020160056711    5/2016
KR    1020170085750    7/2017

* cited by examiner

*Primary Examiner* — Mathew Franklin Gordon
(74) *Attorney, Agent, or Firm* — Studebaker Brackett PLLC (57) ABSTRACT

A point-to-point autonomous driving path generation and driving control method based on a navigation route and a high definition map, which generates a point-to-point autonomous driving path by utilizing both of a route made with a navigation map (SD map) and a lane centerline of a high definition map (HD map). The point-to-point autonomous driving path generation and driving control method based on the navigation route and the high definition map includes a step of acquiring navigation route data; and a step of generating autonomous driving trajectory data on the basis of lane information of the high definition map matched with the navigation route data.

2 Claims, 12 Drawing Sheets

FIG. 1

Prior Art

FIG. 2

Prior Art

POINT-TO-POINT AUTONOMOUS DRIVING PATH GENERATION AND DRIVING CONTROL METHOD BASED ON NAVIGATION ROUTE AND HIGH DEFINITION MAP

BACKGROUND

The present invention relates to an autonomous driving control method, and more specifically, to a point-to-point autonomous driving path generation and driving control method based on a navigation route and a high definition map, which controls driving by generating a navigation route and a lane centerline of a high definition map and generating trajectory data for avoiding an object while driving.

various systems for improving safety and convenience of drivers have been developed according to the increase in the user's requirements for the vehicle.

Furthermore, the researches on intelligent driver support systems that provide a more comfortable and safe driving environment to the drivers is also actively progressing, and ultimately, the researches on control systems for autonomous driving or unmanned autonomous driving are expanding.

A point-to-point autonomous driving refers to a technology in which a vehicle autonomously moves to a destination when the destination is set.

Figure 1:
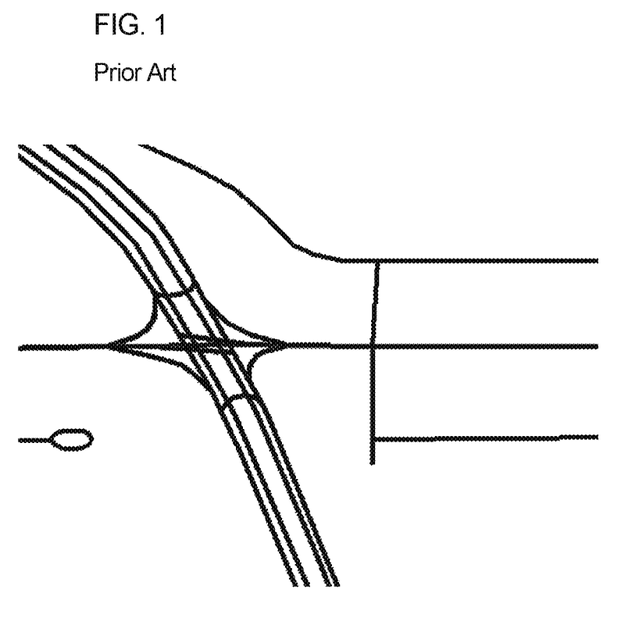
FIG. 1 is a diagram for explaining an example of an SD Map.
Figure 2:
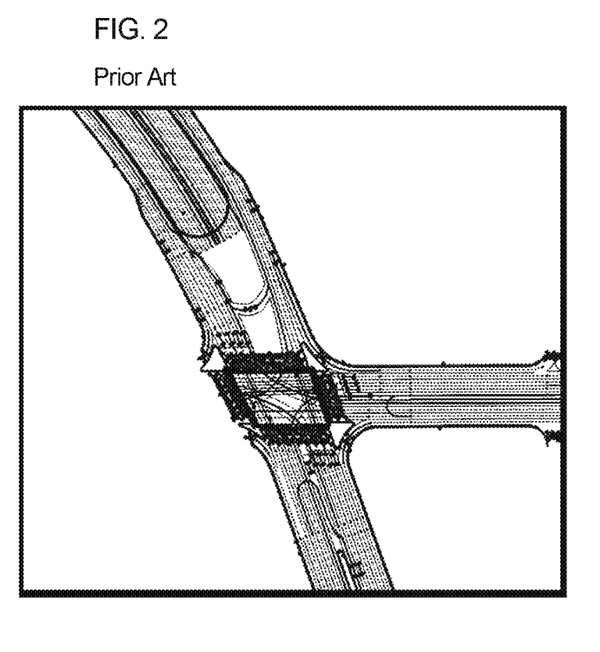
FIG. 2 is a diagram for explaining an example of a HD Map.

FIG. 1 is a diagram for explaining an example of an SD Map and FIG. 2 is a diagram for explaining an example of a HD Map.

Referring to FIG. 1, by using an SD Map (Standard Definition Map), which is an existing navigation map, it is possible to quickly create an optimal driving path to a destination. However, since the road environment with many lanes is implicitly expressed with one or two lines, it is possible to express the approximate location where the vehicle should drive. Accordingly, there is a problem in that the lanes and the points to be driven cannot be accurately expressed.

Referring to FIG. 2, since a HD Map (High Definition Map), which is an ultra-precise map, expresses roads much more accurately and in detail in comparison to the SD Map, it is considered to be suitable for use in autonomous driving. In particular, since the data such as lanes and center lines of the HD Map can be utilized, the driving path can be expressed as an accurate location (coordinate values). However, since the data is too large, it is difficult to quickly find the optimal path.

On the other hand, while the autonomous vehicle is driving, if the vehicles in front move much slower than the surrounding traffic flow, it performs an operation of reducing its speed or changing its driving lane in order to avoid congestion and collision.

According to the conventional lane changing method disclosed in Korean Patent Laid-Open Publication No. 10-2017-0085750, since the vehicle's lane is changed to a lane that is considered to have smooth vehicle traffic according to lateral movement, only an operation of moving a vehicle from a high-congestion lane to a low-congestion lane may be supported.

In addition, when a conventional autonomous vehicle makes a left turn, a U-turn, or a right turn at an intersection, it drives by setting a left turn path, a U-turn path, or a right turn path at the intersection based on an overall route, similar to the general driving.

However, if there are objects such as a parked vehicle, an accident vehicle, or a falling object on a path to make the left turn, the U-turn, or the right turn, a lane change must be made in advance by reflecting the object information. Accordingly, in the existing path setting, there is a problem in that it is difficult to normally change the lane at the point of time when the lane must be changed.

Therefore, there is a need for a technology that efficiently changes lanes in advance when it is detected that there is an object in the lane to be driven, thereby reducing the possibility of deviating from the path and stopping the vehicle due to a lane change failure.

In addition, the existing autonomous driving method recognizes the external environment based on the image acquired by the vision camera and changes lanes by reflecting it. However, since the dependence on the vision camera is high, there is a disadvantage in that the lane change for accident prevention is not performed smoothly under malicious conditions such as difficulties in recognizing the lanes due to a disturbance light owing to weather, a blurring of road paint, or an accident vehicle and its fragments and so forth.

Patent Literature 1: Korean Patent Laid-Open Publication No. 10-2017-0085750 (Jul. 25, 2017; APPARATUS AND METHOD FOR AUTOMATIC STEERING CONTROL BASED ON VEHICLES CHANGING LANES)

Patent Literature 2: Korean Patent Registration No. 10-1664582 (Oct. 4, 2016; APPARATUS AND METHOD FOR GENERATING DRIVING ROUTE OF AUTONOMOUS VEHICLE)

SUMMARY OF THE INVENTION

The present disclosure has been made in an effort to solve the problems described above, and an objective of the present invention is to provide a point-to-point autonomous driving path generation and driving control method based on a navigation route and a high definition map, which generates a point-to-point autonomous driving path by utilizing both of a route made with a navigation map (SD map) and a lane centerline of a high definition map (HD map).

In addition, the present invention is to provide a point-to-point autonomous driving path generation and driving control method based on a navigation route and a high definition map, which gives driving priority for each of a navigation route and a lane of a high definition map and generates driving information for minimizing lane change from starting point to goal point and trajectory for avoiding an object.

According to one aspect of the present invention so as to accomplish these objects, there is provided to a point-to-point autonomous driving path generation and driving control method based on a navigation route and a high definition map including: a step of acquiring navigation route data; and a step of generating autonomous driving trajectory data on the basis of lane information of the high definition map matched with the navigation route data.

At this time, the step of generating the autonomous driving trajectory includes: a step of collecting, when there is lane information of the high definition map matched with the navigation route data, a candidate link group of all lane units of the high definition map matched with a link from starting point to goal point; a step of generating an overall route by processing an optimal link of the candidate links by checking connectivity of each candidate link group from the starting point to the goal point; a step of giving priority for each link by considering connectivity of progress links at intersections and junctions; and a step of generating autonomous driving trajectory data to follow the priority for each link.

In addition, in the step of generating the autonomous driving trajectory data, when it is determined that there is an object obstructing driving in the highest priority link in the progress direction, the trajectory is changed to a link with high priority among the links avoiding the object.

In addition, the step of giving priority for each link by considering connectivity of progress links at intersections and junctions includes a step of setting priority based on the links connected at the intersections and junctions.

In addition, when the lane information matched with the route of the SD map is a lane connected to a right end lane, priority is give in order from the right end link to the left, and when the lane information matched with the route of the SD map is a lane connected to a left lane, priority is give in order from the left end link to the right.

In addition, when the lane matched with the route of the SD map is an intermediate lane, priority is given in order getting away from the lane.

BRIEF DESCRIPTION OF THE DRAWINGS

The above and other objects, features and advantages of the present invention will be more apparent from the following detailed description taken in conjunction with the accompanying drawings, in which.

REFERENCE SIGNS LIST

10: Autonomous driving vehicle
20: Object
P1~P7: Point ID
100: Apparatus
110: Processor
120: Computer-readable storage medium
130: Input/output interface
140: Communication interface
150: Communication bus
200: SD Map
300: HD Map
400: SD Map route

DETAILED DESCRIPTION OF THE PREFERRED EMBODIMENT

Hereafter, the preferred embodiment according to the present disclosure are described in detail with reference to the accompanying drawings. Since the description of the present invention is a mere embodiment for structural and functional description, it must not be interpreted that the scope of the present invention is limited by the embodiments described in the text. That is, since the embodiments can be variously changed and have various forms, it should be understood that the scope of the invention includes the equivalents for realizing the technical concept. Also, since the specific embodiments do not include all objects and effects presented by the present invention, the scope of the present invention is not limited by them.

Unless differently defined, all the terms used here including technical or scientific terms have the same meaning with what is generally understood by one who has common knowledge in the technical field that this invention belongs to. The terms such as those defined in the dictionary commonly used will be interpreted to have the meanings matching with the meanings in the context of the related technologies. Unless clearly defined in this application, they are not interpreted as ideal or excessively formal meanings.

Figure 3:
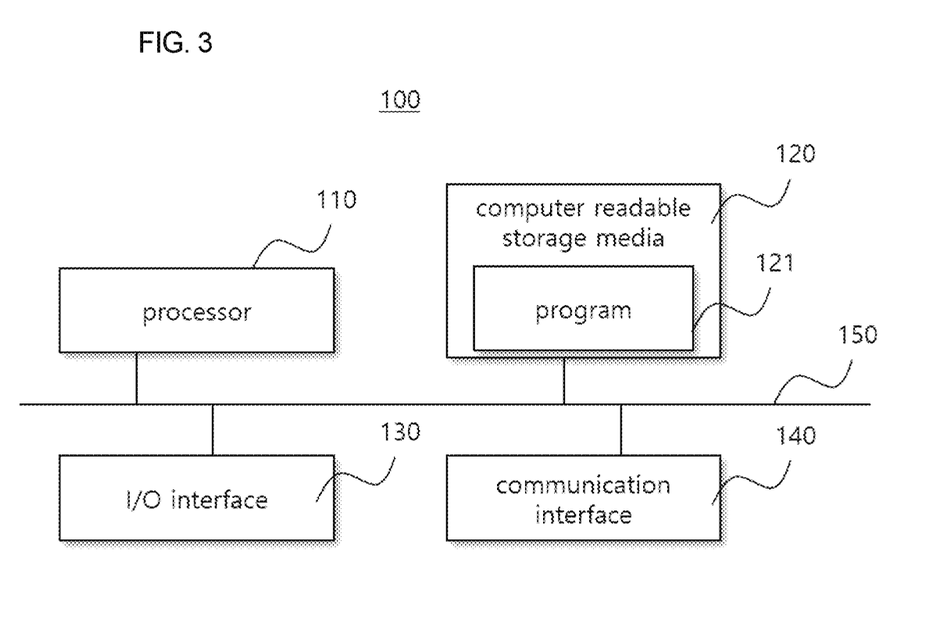
FIG. 3 is a diagram illustrating a configuration of a point-to-point autonomous driving path generation and driving control apparatus based on a navigation route and a high definition map.

FIG. 3 is a diagram illustrating a configuration of a point-to-point autonomous driving path generation and driving control apparatus based on a navigation route and a high definition map.

Referring to FIG. 3, an apparatus (100) according to an embodiment of the present invention is mounted on a vehicle such as an autonomous driving vehicle, gives lane driving priority of a navigation route and a high definition map, and may generate and utilize driving information of reaching the goal point and a trajectory for avoiding an object in the case of following the priority and driving.

Herein, the trajectory includes location information (coordinates x, y), and is trajectory information which an autonomous driving vehicle can follow.

In other words, according to the present invention, an autonomous driving vehicle can drive using the trajectory information of lane centers from starting point to goal point. Particularly, when using the lane priority of the trajectory, in addition to driving to the goal point, it is possible to achieve safe autonomous driving by providing driving information for avoiding an unexpected object (vehicles in accident, illegally parked vehicles, falling objects, etc.) which may occur ahead.

According to the present invention, it is possible to provide safe driving information to the goal point when utilizing a high definition map (HD map) in level 4 autonomous driving.

To this end, the apparatus (100) may include at least one processor (110), a computer-readable storage medium (120), and a communication bus (150).

The processor (110) may control the apparatus (100) to operate. For example, the processor (110) may execute one or more programs (121) stored in the computer-readable storage medium (120). One or more programs (121) may include one or more computer-readable commands. When the computer-readable commands are executed by the processor (110), the commands may be configured to allow the apparatus (100) to perform operation of giving and following lane driving priority and generating and utilizing trajectory to reach the goal point while avoiding an object.

The computer-readable storage medium (120) is configured to store computer-readable commands, program codes, program data and/or other suitable types of information for giving and following lane driving priority and generating and utilizing trajectory to reach the goal point while avoiding an object. The program (121) stored in the computer-readable storage medium (120) includes a set of commands executable by the processor (110). In an embodiment, the computer-readable storage medium (120) may be a memory (volatile memory such as random access memory, nonvolatile memory, or suitable combination thereof), one or more magnetic disk storage devices, optical disk storage devices, flash memory devices, and other types of storage mediums which are accessed by the apparatus (100) and can store desired information, or suitable combination thereof.

The communication bus (150) connects various components of the apparatus (100) including the processor (110) and the computer-readable storage medium (120), to each other.

The apparatus (100) may include one or more input/output interfaces (130) providing an interface for one or more input/output devices, and one or more communication interfaces (140). The input/output interface (130) and the communication interface (140) are connected to the communication bus (150). The input/output device (not illustrated) may be connected to other components of the apparatus (100) through the input/output interface (130).

Hereinafter, an autonomous driving path generation method according to an embodiment of the present invention will be described with reference to FIG. 4 to FIG. 8.

Figure 4:
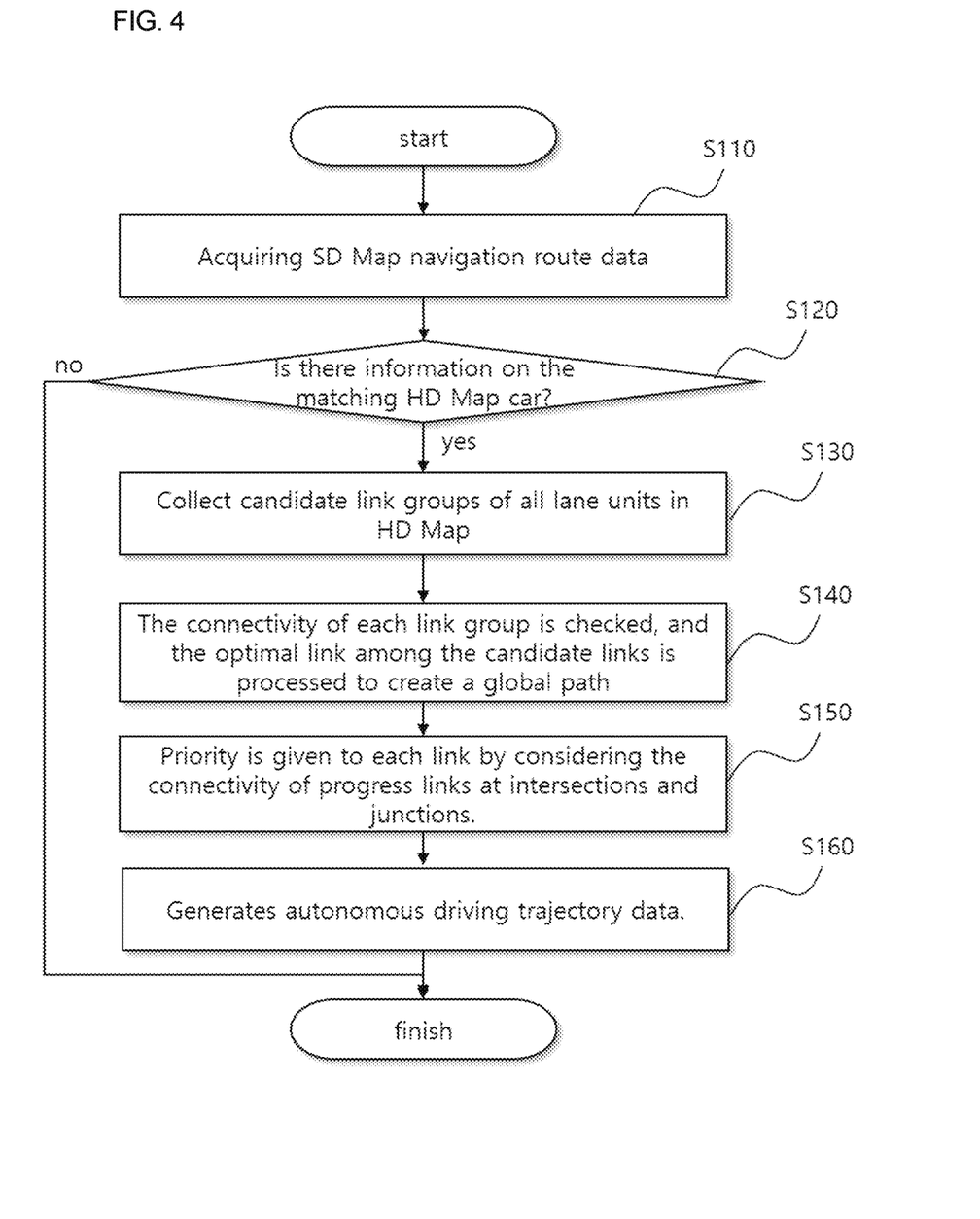
FIG. 4 is a flowchart illustrating the autonomous driving path generation method according to an embodiment of the present invention.
Figure 5:
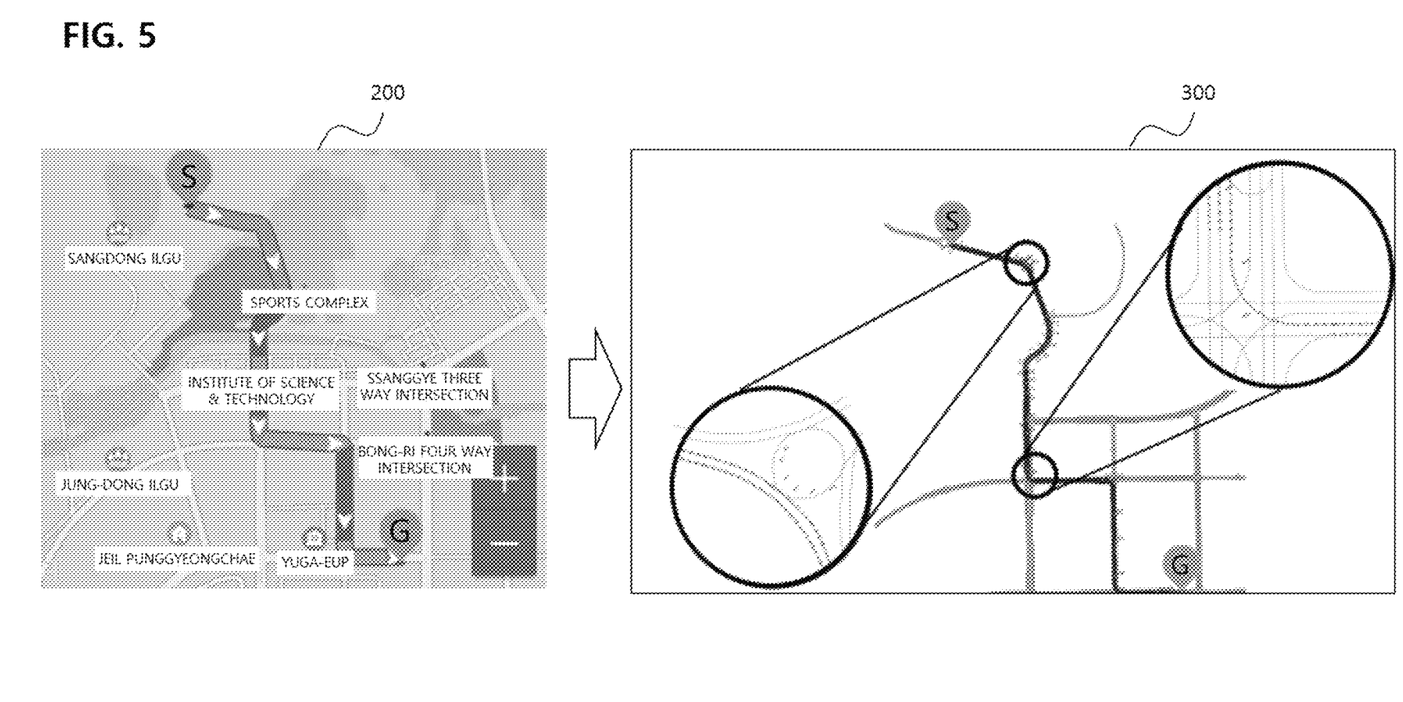
FIG. 5 is a diagram illustrating an example of matching between an SD map and an HD map according to an embodiment of the present invention.
Figure 6:
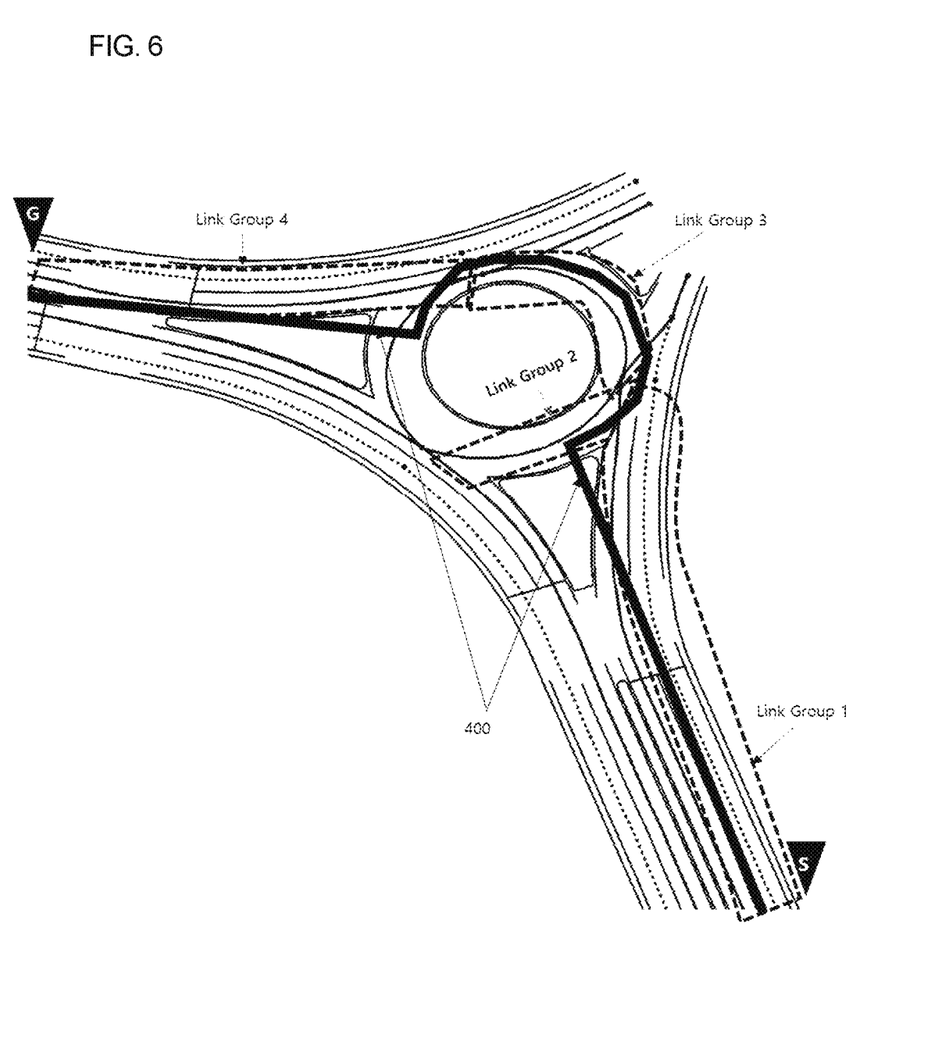
FIG. 6 is a diagram illustrating an overall route generation step of processing an optimal link.
Figure 7:
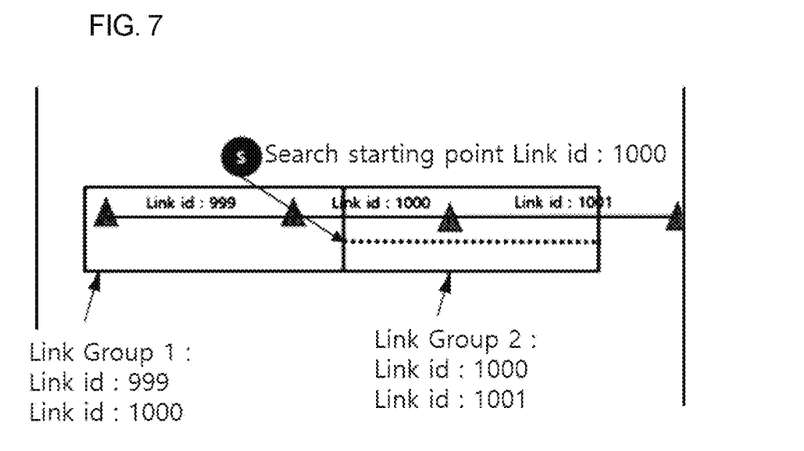
FIG. 7 and FIG. 8 are diagrams illustrating an example of confirmation of link groups of starting point and goal point according to an embodiment of the present invention.
Figure 8:
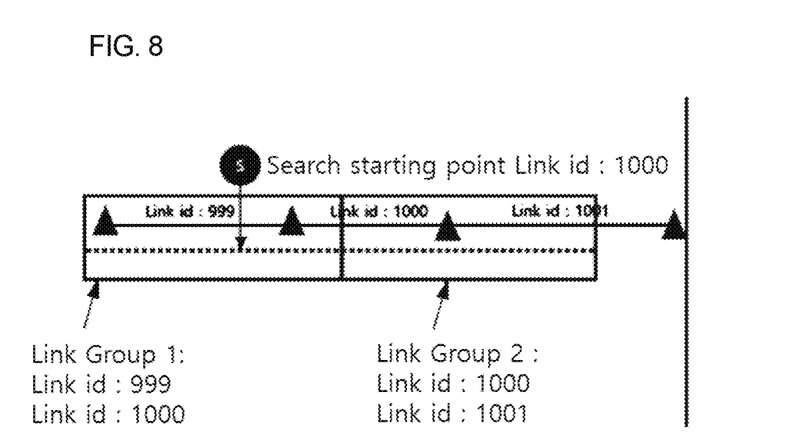

FIG. 4 is a flowchart illustrating the autonomous driving path generation method according to an embodiment of the present invention, FIG. 5 is a diagram illustrating an example of matching between an SD map and an HD map according to an embodiment of the present invention, FIG. 6 is a diagram illustrating an overall route generation step of processing an optimal link, and FIG. 7 and FIG. 8 are diagrams illustrating an example of confirmation of link groups of starting point and goal point according to an embodiment of the present invention.

Referring to FIG. 4, the processor (110) of the apparatus (100) acquires navigation route data of an SD map (S110).

Then, the processor (110) determines whether there is route information of an HD map matched with the navigation route data of the SD map (S120). As illustrated in FIG. 5, when the navigation route (200) of the SD map is matched with the HD map (300), the processor (110) may collect candidate link groups of all lane units of the HD map matched from starting point to goal point (S130).

In this case, a road expressed by one link of the SD map is expressed by a plurality of links of the HD map. Accordingly, the route data made by the SD map should be matched with the plurality of links of the HD map.

In order to improve this, the concept of link group was introduced. When a plurality of links are combined into one link group, operations that is needed to match with dozens of HD map links can be replaced with operations for several groups. Accordingly, fast matching is possible.

For example, as illustrated in FIG. 6, since there are a plurality of link groups on the route from starting point(S) to goal point (G), candidates Link Groups 1 to 4 of all lane units matched with the route are collected.

Then, the processor (110) may collect link groups corresponding to the lane matched with the route (400) of the SD map, remove unnecessary links of the links positioned from starting point(S) to goal point (G), check connectivity of each link group, and process an optimal link of candidate links, thereby generating an overall route (S140).

For example, as illustrated in FIG. 6, Link Group 2 of the candidate link groups from starting point(S) to goal point (G) is an unnecessary link and thus is removed.

In this case, a link group of starting point and goal point is confirmed by the following process.

First, at a vertex of an edge link in the link group, the closest point to 'starting point' or 'goal point' is found. This happens when a difference in distance from the actual starting point/goal point occurs, as illustrated in FIG. 7.

After finding a previous link group before projecting a starting point vertex and confirming whether the link group includes a starting point link (linkid 1000), it was included in a projection candidate group as illustrated in FIG. 8.

Link group connectivity of confirming whether the remaining Link Groups 1, 3, 4 are connected well is checked, and finally, an optimal link consisting of Link Groups 1, 3, 4 is processed to generate an overall route.

In this case, the link group of the matched HD map should be arranged in order according to a driving direction of a vehicle. Since a link of the HD map is connected through nodes and includes from-node and to-node, the connectivity between the from-node and the to-node is confirmed.

Figure 9:
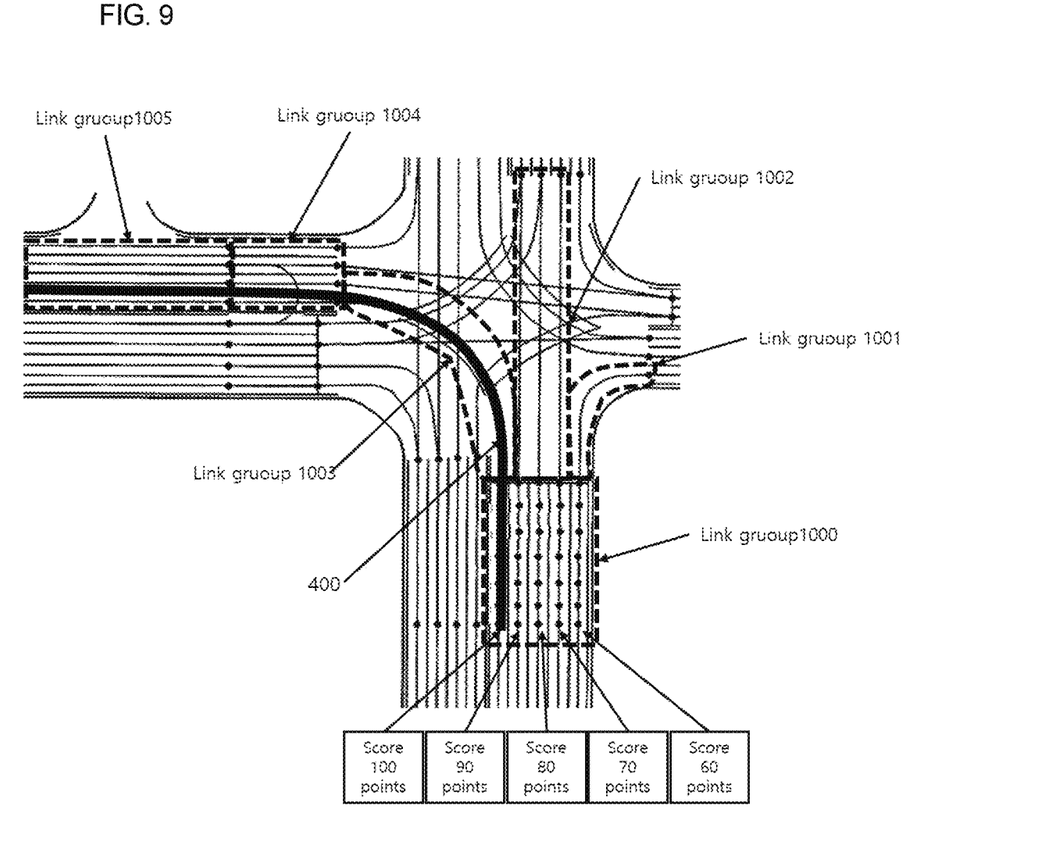
FIG. 9 is a diagram illustrating an overall route generation method of processing an optimal link at intersections and junctions according to an embodiment of the present invention.

FIG. 9 is a diagram illustrating an overall route generation method of processing an optimal link at intersections and junctions according to an embodiment of the present invention.

Referring to FIG. 9, link groups corresponding to a route matched with a route (400) of the SD map at intersections and junctions ahead are collected.

Connectivity of the collected link groups is checked, the link groups are arranged in order of a link group (1000), a link group (1003), a link group (1004), and a link group (1005).

Subsequently, priority may be given to each link on the overall route generated in Step S140 as illustrated in FIG. 9 on the basis of connection lane links of the link group (1000) and the link group (1003) connected at intersections and junctions (S150).

The priority may be set on the basis of information such as location of goal point and connectivity of right, left, and straight lanes of progress links at intersections and junctions. In FIG. 9, the priority is given as scores, but may be given as ranking values.

Thereafter, the processor (110) may generate autonomous driving trajectory data to follow the priority for each link from starting point(S) to goal point (G) (S160).

In this case, the processor (110) gives points for each certain distance such that an autonomous driving vehicle is suitable to drive before generating the autonomous driving trajectory data, and gives an ID and priority for each point.

Figure 10:
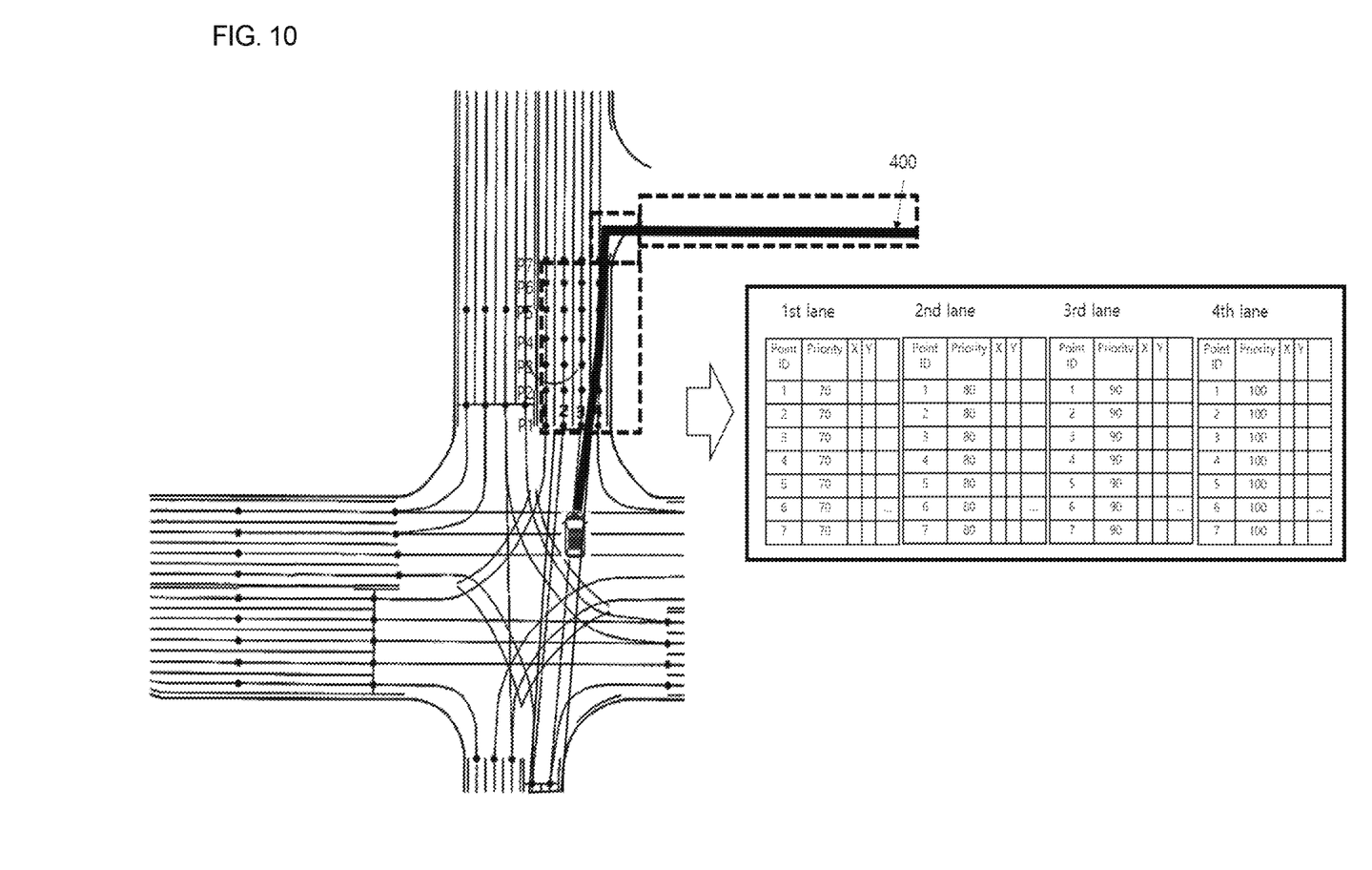
FIG. 10 and FIG. 11 are diagrams illustrating a method for giving priority for each link in consideration of connectivity of progress links at intersections and junctions according to an embodiment of the present invention.
Figure 11:
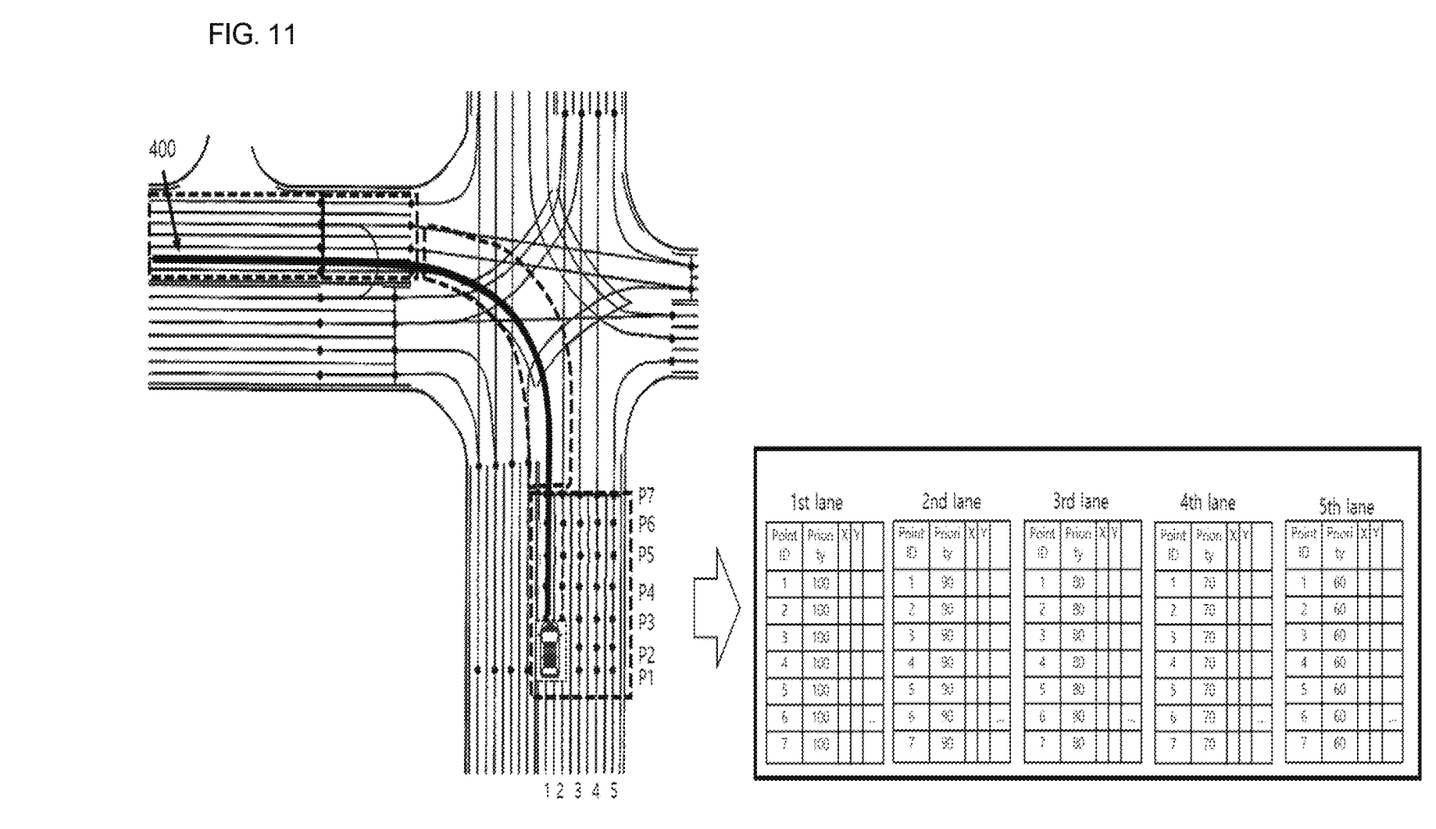

FIG. 10 and FIG. 11 are diagrams illustrating a method for giving priority for each link in consideration of connectivity of progress links at intersections and junctions according to an embodiment of the present invention.

As illustrated in FIG. 10, when lane information matched with the route (400) of the SD map at the intersection and junction ahead is a lane connected to a right end lane (right turn), priority is given for each point ID of a driving path, and the priority is given in order from the right end lane to the left.

In other words, as illustrated in FIG. 9, when the driving path has 4 lanes, priority is given in order of fourth lane>third lane>second lane>first lane.

As illustrated in FIG. 11, when lane information matched with the route (400) of the SD map at the intersection and junction ahead is a lane connected to the left end lane (left turn or U turn), priority is given for each point ID of a driving path, and the priority is given in order from the left end lane to the right.

In other words, as illustrated in FIG. 11, when the driving path has 5 lanes, priority is given in order of first lane>second lane>third lane>fourth lane>fifth lane.

In addition, according to the present invention, in the step of generating the autonomous driving trajectory data, when it is determined that there is an object obstructing driving at the top priority link in the progress direction, the trajectory is changed to a high priority link among links avoiding the object to prevent an accident caused by collision with the object.

Figure 12:
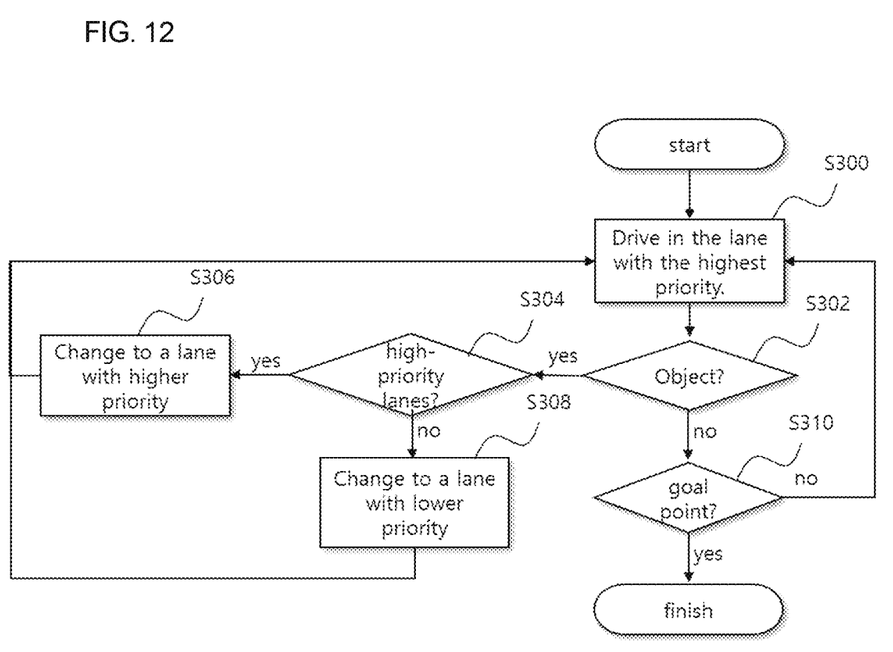
FIG. 12 is a flowchart illustrating an example of autonomous driving and a driving control method for avoiding an object during driving.

FIG. 12 is a flowchart illustrating an example of autonomous driving and a driving control method for avoiding an object during driving, and a vehicle is controlled to drive autonomously by following priority set according to autonomous driving trajectory data generated by the processor (110) (S300).

In this case, the autonomous driving control may include a process of changing a lane according to a distance from a vehicle driven in a target lane, entry of another vehicle into the target lane, road congestion, and the like.

Subsequently, the processor (110) determines whether there is an object obstructing driving on the basis of high definition map data and real-time location information while controlling the vehicle to drive autonomously (S302).

The processor (110) determines whether there is a lane with priority higher than that of currently driving lane to avoid an object (S304). When there is the lane with high priority, the processor (110) changes the lane to the lane with high priority (S306). Otherwise, the processor (110) changes the lane to a lane with low priority (S308).

In other words, according to the present invention, when it is determined that there is an object obstructing driving, lane trajectory is changed to avoid the object, and a vehicle is controlled to drive according to the changed trajectory, thereby preventing an accident caused by collision with the object.

In this case, objects are factors obstructing driving of a vehicle, such as parked vehicles, vehicles in accidents, and falling objects. When the risk of collision is expected due to the close distance to the object, operation of reducing a driving speed may be further performed to avoid the collision.

According to the embodiment of the present invention as described above, the processor (110) controls the autonomous driving of the vehicle according to the driving priority of the driving trajectory for each lane processed into a precision map, and the control is ended when reaching the goal point.

Meanwhile, when there is information of entry to a turn lane ahead, a vehicle is controlled to drive to follow a lane with high priority on the basis of priority given for each turn type.

In this case, while controlling a vehicle to drive in a priority driving lane, when there is an object obstructing driving in the priority driving lane, it is determined whether there is a lane with higher priority than that of the current driving lane.

In this case, when there is a lane with higher priority than that of the current driving lane, the driving trajectory is changed to the lane with higher priority than that of the current driving lane and the lane is changed, and when there is no lane with higher priority than that of the current driving lane, the driving trajectory is changed to a lane with lower priority than that of the current driving lane and the lane is changed, thereby avoiding collision with an object.

Figure 13:
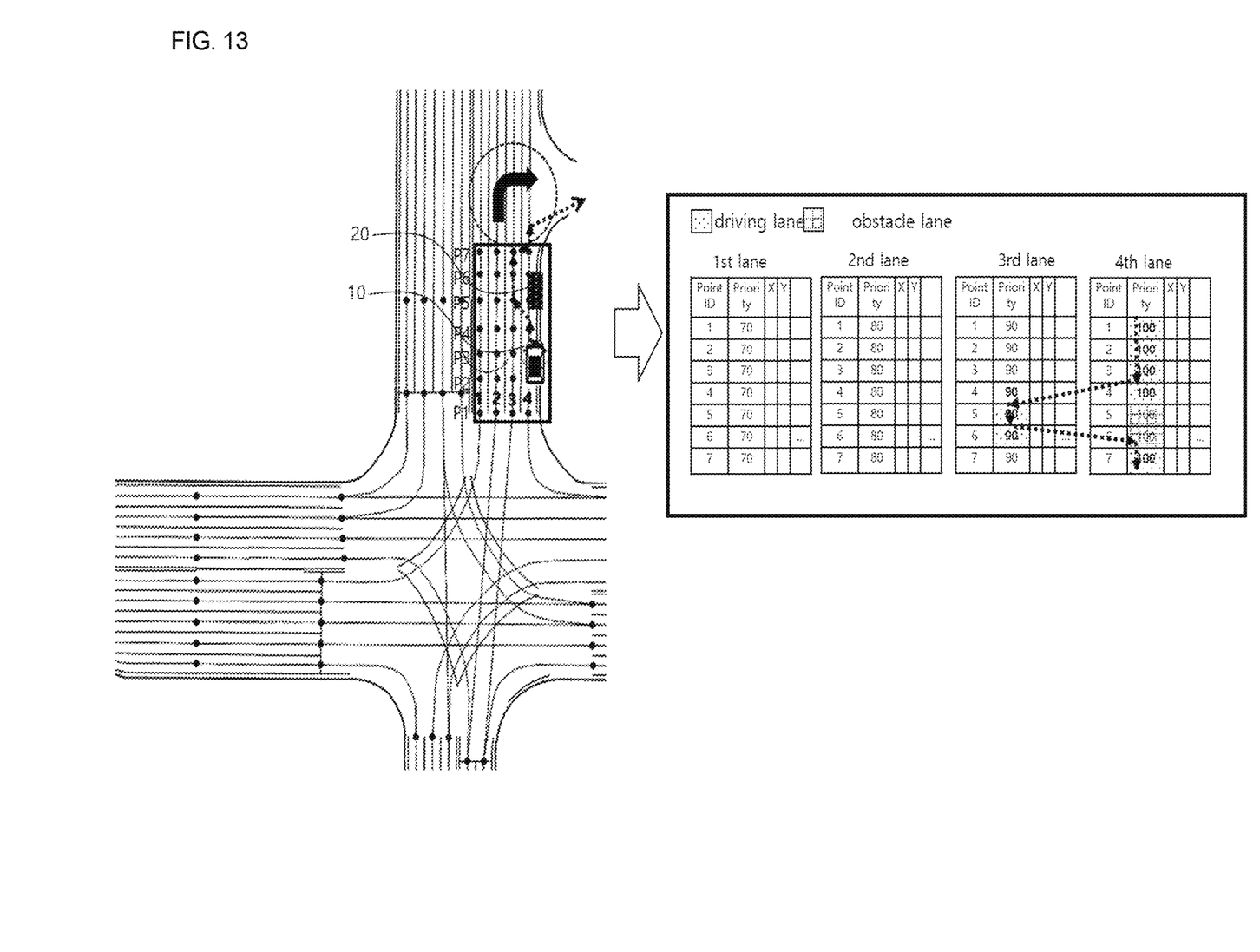
FIG. 13 and FIG. 14 are diagrams illustrating a driving control method when there is an object in a priority driving lane at intersections and junctions according to an embodiment of the present invention.
Figure 14:
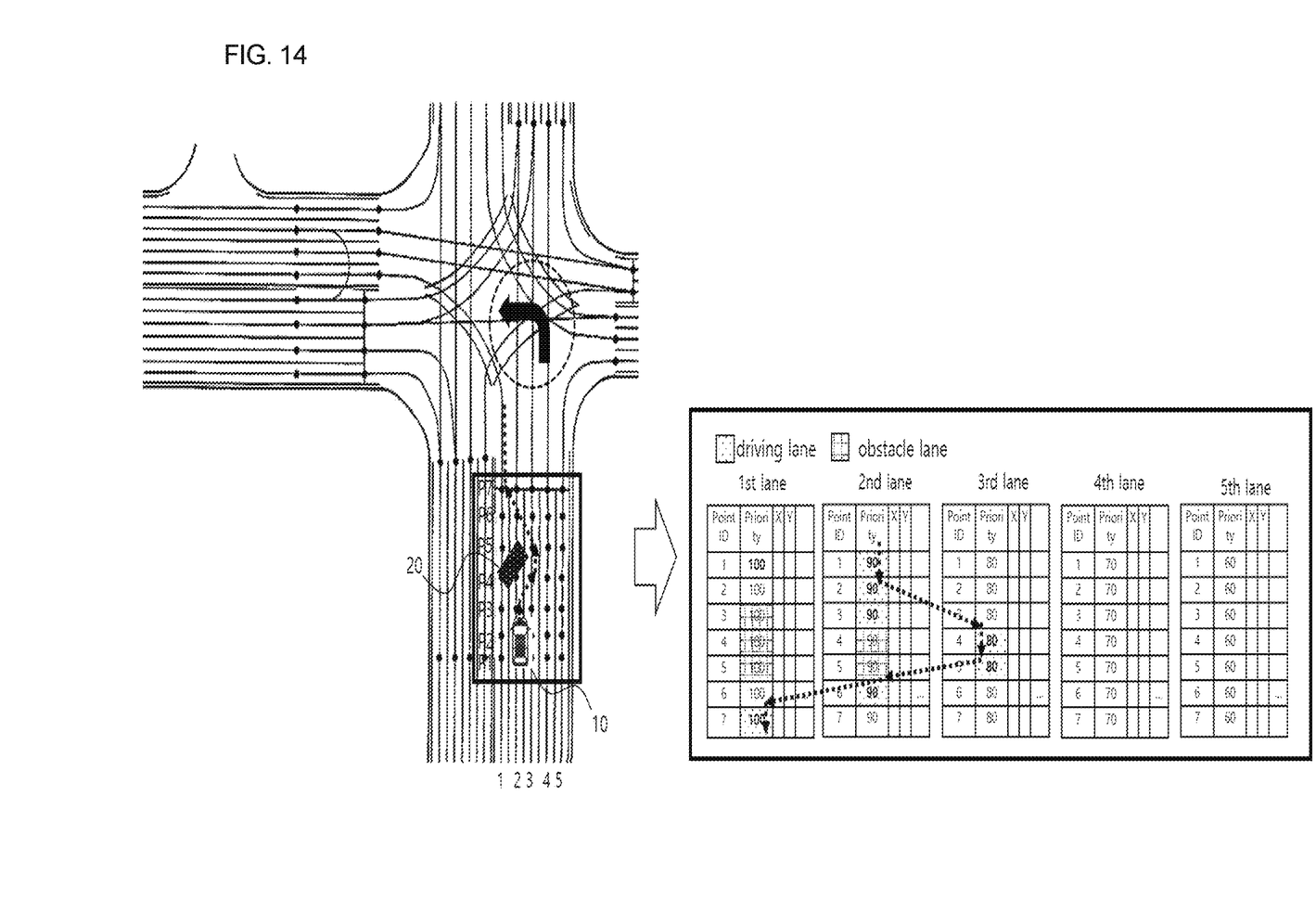

FIG. 13 and FIG. 14 are diagrams illustrating a driving control method when there is an object in a priority driving lane at intersections and junctions according to an embodiment of the present invention.

First, as illustrated in FIG. 13, when lane information matched with a route of the SD map is a lane connected to a right end lane, priority of each point ID on a driving path is set to fourth lane>third lane>second lane>first lane. Since a trajectory is generated to follow the priority driving lane from the first point ID (P1) to the fourth point ID (P4), a vehicle drives in the fourth lane.

In this case, since there is an object in the fourth lane which is the priority driving lane at the locations of the fifth point ID (P5) and the sixth point ID (P6), a trajectory is generated to drive in the third lane with the second priority at the locations of the fifth point ID (P5) and the sixth point ID (P6) to avoid the object and the lane is changed.

Subsequently, since there is no object in the fourth lane which is the priority driving lane at the location of the seventh point ID (P7), a trajectory is generated to drive in the fourth lane with the first priority and the lane is changed.

Meanwhile, as illustrated in FIG. 14, when lane information matched with a route of the SD map is a lane connected to a left end lane, priority of each point ID on a driving path is set to first lane>second lane>third lane>fourth lane>fifth lane.

In this case, when it is assumed that the autonomous driving vehicle is driving in the second lane, a trajectory is tried to be changed to the first lane which is the priority driving lane for left turn or U turn, but there is an object at the locations of the fourth point ID (P4) and the fifth point ID (P5).

In other words, the priority driving lane cannot be used on the driving path of the vehicle driving in the second lane.

Then, the vehicle driving in the second lane changes the trajectory data to a lane with low priority to avoid collision, and follows the trajectory data to drive in the third lane from the fourth point ID (P4) to the fifth point ID (P5).

At the location of the sixth point ID (P6) where there is priority after passing by the object, the trajectory data is changed to the second lane with high priority, and at the location of the seventh point ID (P7), the trajectory data is changed to the first lane with higher priority.

As described above, when there is autonomous driving trajectory information ahead the route to drive, the driving is controlled to follow the lane with high priority, and when an object obstructing the driving of the lane with high priority such as a parked vehicle, a vehicle in an accident, or a falling object is found, it is possible to prevent deviation from a route and vehicle stop caused by lane change failure and prevent an accident, by following the trajectory data.

According to the present invention, since a point-to-point autonomous driving path is generated by utilizing both of a route made with a navigation map (SD map) and a lane centerline of a high definition map (HD map), it is possible to make safe driving information to minimize lane change to the goal point when utilizing the high definition map (HD map) in level 4 autonomous driving.

In addition, according to the present invention, during autonomous driving, it is possible to achieve safer autonomous driving a lane is changed to a pre-generated trajectory to avoid the object when there is an object that interferes with driving in the driving lane, and to reduce the possibility of deviating from the route and stopping the vehicle due to lane change failure, thereby being expected to contribute to dissemination of autonomous driving technology.

While the present invention has been described with respect to the specific embodiments, it will be apparent to those skilled in the art that various changes and modifications may be made without departing from the spirit and scope of the invention as defined in the following claims.

What is claimed is:

1. A point-to-point autonomous driving path generation and driving control method based on a navigation route and a high definition map, comprising:

acquiring navigation route data; and generating autonomous driving trajectory data based on lane information of the high definition map matched with the navigation route data, wherein the generating the autonomous driving trajectory data comprises:

collecting a candidate link group of a respective lane unit of all lane units of the high definition map matched with a link from a starting point to a goal point of a driving path;

generating an overall route by processing an optimal link of candidate links of the collected candidate link groups by checking connectivity of each candidate link group from the starting point to the goal point of the driving path;

giving priority for each link by considering connectivity of progress links at intersections and junctions; and generating the autonomous driving trajectory data to follow the priority for each link, and wherein the giving the priority comprises:

when the lane information at the intersection and junction ahead is a lane connected to a right end lane for a right turn, the priority is given in order from a link of the right end lane to a link of a left end lane in the driving path, when the lane information at the intersection and junction ahead is a lane connected to a left lane for a left turn or a U turn, the priority is given in order from the link of the left end lane to the link of the right end lane in the driving path, and when the lane information is an intermediate lane, the priority is given in order links being away from the intermediate lane in the driving path.

2. The point-to-point autonomous driving path generation and driving control method according to claim 1, wherein the generating the autonomous driving trajectory data comprises:

when it is determined that there is an object obstructing driving in the highest priority link in a progress direction, a trajectory of the autonomous driving trajectory data is changed to a link avoiding the object.

* * * * *